UNITED STATES PATENT OFFICE.

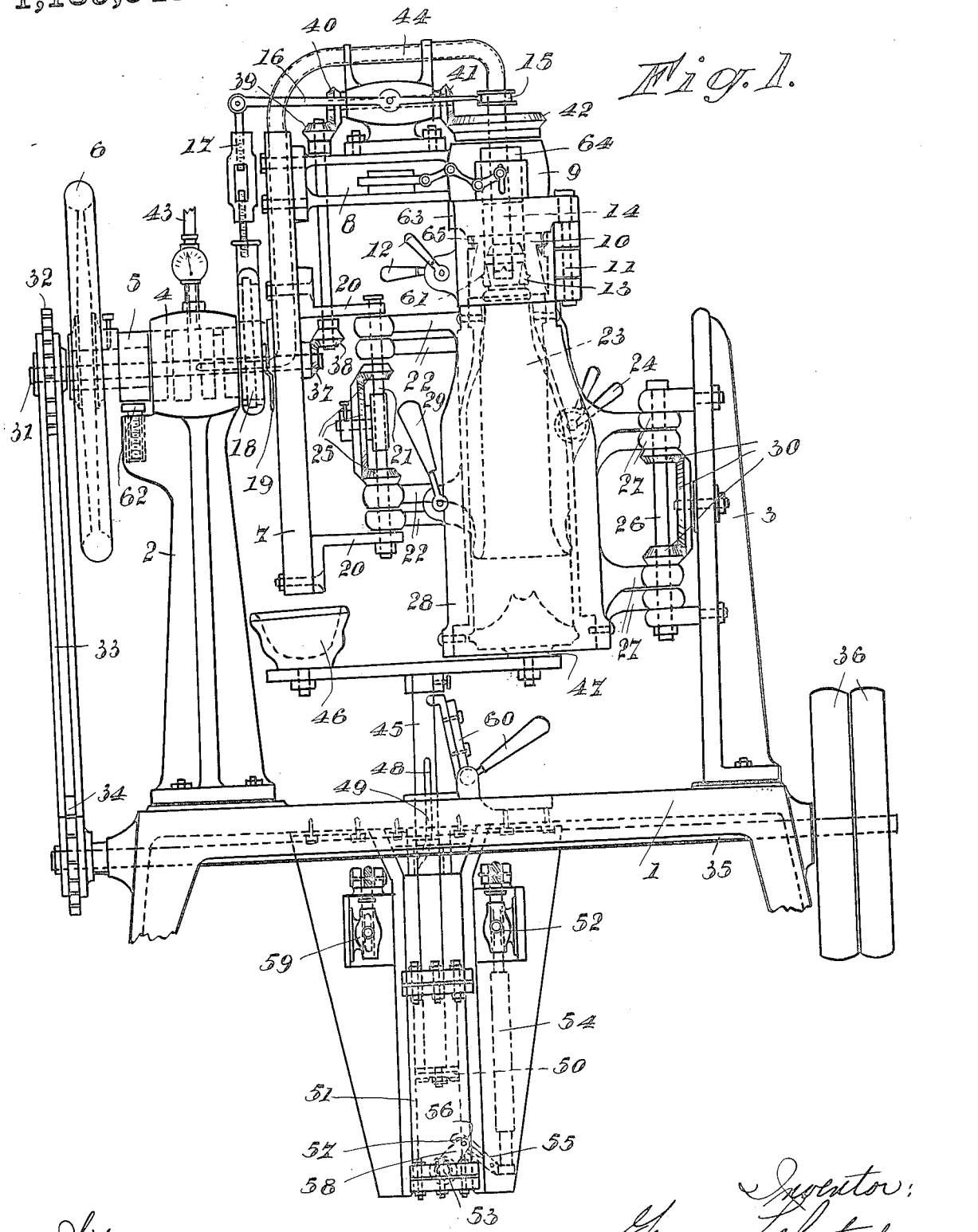

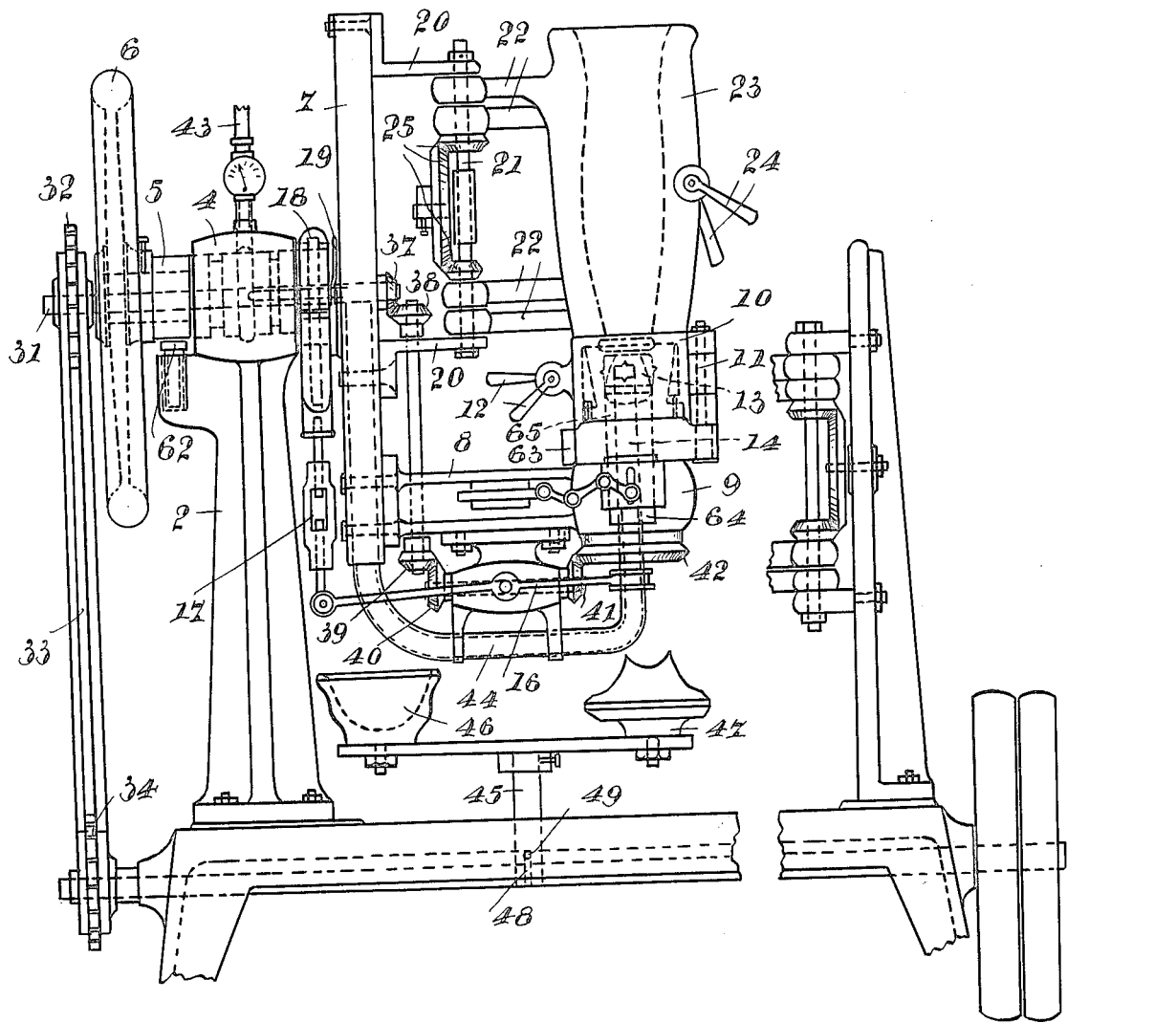

GEORGES LEFORT, OF CLABECQ, TUBIZE, BELGIUM.

AUTOMATIC MACHINE FOR BLOWING SEAMLESS BOTTLES AND OTHER ROUND VESSELS.

1,139,545.

Specification of Letters Patent. Patented May 18, 1915.

Application filed September 15, 1913. Serial No. 789,813.

*To all whom it may concern:*

Be it known that I, GEORGES LEFORT, a subject of the King of Belgium, residing at Clabecq, Tubize, Belgium, have invented a new and useful Automatic Machine for Blowing Seamless Bottles and other Round Vessels; and I do hereby declare the following to be a full, clear, and exact description of the same.

The object of this the present invention is an automatic machine for blowing seamless bottles and other round vessels, the main characteristic feature of which is that the bottle or vessel is caused to revolve in its mold in such a way that it completely suppresses all edges or seams hitherto left in the bottle by the mold.

The drawings annexed hereto show by way of example one form of execution of the object of this invention.

Figure 1, is a front view of machine complete, the blank mold and the finishing mold being supposed to be closed up over one another. Fig. 2, is a front view of the machine, ready for casting glass therein, *i. e.* into the blank mold (the finishing mold not being shown).

The present machine consists of a frame 1, upon which there are arranged two supports 2 and 3. At the upper end of support 2 there is arranged, rotary in a bearing 4, a shaft 5 which is hollow and upon which there is fixed a fly-wheel 6, on the one part, and a working beam 7 acting also as a support, on the other part. On the working beam 7 there is arranged an arm 8 at the end of which there is hung in a ball bearing 9, the ring mold 10 which consists of two parts which are joined by means of a hinge 11 and capable of being closed or opened by means of handles 12.

In the ring mold 10, there is provided a part 13 forming the upper part of the neck of the bottle; said part 13 is hung to a hollow spindle 14 extending across the bearing 9 and capable of vertical displacement to a very small extent by means of a collar 15 and of a lever 16 also of an adjustable rod 17 which can be displaced by means of an eccentric 18 provided with a handle 19. Said eccentric 18 is fitted on to the hollow shaft 5 and therefore revolves with the latter. Onto the working beam 7, there are also arranged two arms 20 bearing a spindle upon which there are hinged freely arms 22 supporting the blank mold 23 shown in dotted lines (Fig. 1). The two parts forming the said mold are capable of opening or being closed by means of handles 24 and through the medium of the gearing 25, when one of these half-molds is being displaced, the other half moves in the opposite direction. On the support 3 there is provided a vertical spindle 26 bearing freely arms 27 which latter support the finishing mold 28. The latter like the ring mold consists of two parts and is capable of opening and of being closed by means of handle 29 and the gearing 30 also causes the parts to move in opposite directions. Across the hollow shaft 5 there is arranged a rotary spindle 31 and at one of the ends thereof there is arranged a toothed wheel 32 which through the medium of chain 33 receives a rotary motion from the toothed wheel 34 which is keyed on to the driving shaft 35 which is itself operated by the pulleys 36. Said spindle 31 passes across the hollow shaft 5 and the working beam 7 and at its other end bears a conical pinion 37 which through the medium of pinions 38, 39, 40 and 41, transmits a rotary motion to pinion 42 which latter is keyed on to the part bearing the ring mold 10. Pinion 42 rests on balls on the bearing 9.

Compressed air intended for blowing bottles is led in through a pipe 43, goes across bearing 4, shaft 5, working beam 7, passes through pipe 44 and through the hollow spindle 14 to come out through part 13 wherein the opening is normally closed by a marble so as to prevent glass from penetrating into said opening when glass is cast into the blank mold 23. On the frame 1 and passing through the same there is arranged a vertical shaft 45, supporting a pot 46 and a part 47 arranged opposite one another or at 45°. In the shaft 45 there is provided an helicoidal slot 48 wherein engages a pin 49 fixed on to the frame.

The end of the shaft 45 is terminated by a piston 50 capable of being displaced in a cylinder 51 by means of compressed air. The inlet of air into the cylinder is controlled by means of a cock 52 operated either through a hand or foot pedal not shown on drawing and connected in a suitable manner with an exhaust cock 53 which automatically opens and shuts as and when said inlet cock 52 is being opened or closed.

These cocks are connected by a rod 54 which is linked on a link 55 provided with a slot 56 wherein engages a fixing set screw 57 arranged on an arm 58 driving the cock 53.

Cock 59 is connected by a suitable pipe to the inlet tube 43 and is also driven by means of a pedal which is not shown in the drawing.

Thanks to the helicoidal slot, when the shaft 45 is displaced vertically pot 46 or part 47 is moved into alinement with the mold. The latter part 47 may be fitted on balls in order to revolve together with the glass, should part 47 bear various inscriptions or signs to be stamped into the bottom of the bottle.

60 is a latch to lock shaft 45 with part 47 underneath the bottle.

In order to secure and bear the glass during rotation of the bottle in the finishing mold 28, the ring mold 10 is internally provided with a suitable number (four for example) of concavities 61 wherein glass penetrates and thus forms corresponding knots on the neck of the bottle.

The working of the apparatus is as follows: By means of the fly-wheel 6, shaft 5 is caused to turn half a revolution; the working beam and support combined 7 is correspondingly driven and the appliance carried by the support 7 is caused to assume the position as shown in Fig. 2. Of course, before giving the above mentioned half revolution, care should be taken to completely open the finishing mold 28 and to lower down shaft 45. So that the half revolution of the shaft 5 be limited the latter is provided with two flat notches which cause it to catch after each half revolution onto a spring stop 62. When the apparatus is brought to the position shown in Fig. 2, the ring mold 10 is closed the same as the blank mold 23. Glass is thereupon introduced by pouring it through the upper part of the blank mold. The air contained in the mold then escapes through one or several slots 65. When glass has more or less solidified, shaft 5 is turned back again half a revolution by means of fly-wheel 6, so that the appliance be again in the position as shown in Fig. 1, and the blank mold 23 is opened and then allows the bottle to hang by the neck in the ring mold. Should glass be too hot, pot 46 should be brought underneath by means of piston 50. Thereupon, the finishing mold 28 is closed over the glass, after having fitted into the lower part of mold 28 part 47 which thus forms the bottom of the mold, while the upper part of mold 28 fits snugly against ring mold 10 under neck of bottle. Thereafter, it will suffice to allow compressed air to enter into the bottle, by means of cock 59, through the tube 43, bearing 4, shaft 5, support 7, pipe 44, and thus reach the bottle through part 13. During the blowing of the bottle, the driving shaft 35 causes the ring mold 10 to revolve while the finishing mold 28 remains motionless, the result thereof being—and this is the capital point of the invention—that when the bottle is finished by reason of its having rotated within the finishing mold there are not any traces left of edges or seams.

When bottle is completed and while the latter is still revolving, the finishing mold is opened and the bottle is then taken out by opening the ring mold 10. In order to stop the rotary motion of the latter, it is fitted with a notch 63 wherein a catch 64 can be made to fall down by hand. In order to prevent the bottle remaining attached to part 13, previous to opening the ring mold 10, the said part 13 is lifted vertically through the lever 16, the rod 17 and the eccentric 18, by lowering down handle 19. Therefore the finished bottle does not show any seam, the separation line between molds 28 and 10 being always found near the strengthened part of the neck.

It is obvious that inside the external cases containing the various types of molds, any kind or shape of molds can be inserted for the purpose of obtaining any kind of vessel; the same applies to part 47 forming the bottom of the bottle, which may also vary at will.

The various parts the above machine consists of may also vary in form and dimensions, for this does not in any way alter the principle of the invention.

Having fully described my invention, what I claim and desire to secure by Letters Patent, is:

1. A machine for blowing seamless bottles, comprising a base, supporting members carried by said base, a hollow shaft carried by one of said members, means carried by said base adapted to produce air pressure for blowing bottles and connected to said hollow shaft, a working beam pivotally mounted on said hollow shaft, and provided with a mold, non-rotatably mounted thereon, a ring adapted to be secured to said mold, rotatable means with said ring adapted to grip the neck of the bottle to be blown, means for rotating said means and means carried by said beam for vertically displacing said rotating means, driving means for said hollow shaft, a rotatable base support for said bottle carried by said base, and means coacting with said hollow shaft and gripping rings serving to rotate said bottle within said mold, substantially as described.

2. A machine for blowing seamless bottles, comprising supporting members carried by said base, a hollow shaft carried by one of said members, means adapted to produce air pressure for blowing bottles and connected to said hollow shaft, a working beam pivotally mounted on said hollow shaft and provided with a mold, non-rotatably mounted thereon, a ring adapted to be secured to said mold, rotatable means with said ring adapted to grip the neck of the bottle to be blown, means for rotating said last mentioned means, and means carried by said beam for vertically displacing said rotating means, driving means for said hollow shaft, a rotatable base support for said bottle carried by said base, and means co-acting with said hollow shaft and gripping rings serving to rotate said bottle within said mold, substantially as described.

In testimony whereof, I have signed my name to this specification in the presence of two subscribing witnesses.

GEORGES LEFORT.

Witnesses:
 A. OESHELE,
 CHAS. ROY NASMITH.